US012614450B2

(12) United States Patent
Gupta et al.

(10) Patent No.: US 12,614,450 B2
(45) Date of Patent: Apr. 28, 2026

(54) METHOD AND APPARATUS FOR SPATIAL AGGREGATION FOR LOCATION-BASED SERVICES

(71) Applicant: HERE Global B.V., Eindhoven (NL)

(72) Inventors: Rohit Gupta, Son en Breugel (NL); David Jonietz, Zürich (CH); Bo Xu, Lisle, IL (US); Ali Soleymani, Zürich (CH); Reinhard Walter Köhn, Berlin (DE)

(73) Assignee: HERE Global B.V., Eindhoven (NL)

( * ) Notice: Subject to any disclaimer, the term of this patent is extended or adjusted under 35 U.S.C. 154(b) by 545 days.

(21) Appl. No.: 17/941,580

(22) Filed: Sep. 9, 2022

(65) Prior Publication Data

US 2024/0087448 A1 Mar. 14, 2024

(51) Int. Cl.
G08G 1/01 (2006.01)
G06F 16/29 (2019.01)
G06F 18/21 (2023.01)
G08G 1/017 (2006.01)

(52) U.S. Cl.
CPC ........... G08G 1/0133 (2013.01); G06F 16/29 (2019.01); G06F 18/217 (2023.01); G08G 1/017 (2013.01)

(58) Field of Classification Search
CPC ...... G08G 1/0133; G08G 1/017; G06F 16/29; G06F 18/217
See application file for complete search history.

(56) References Cited

U.S. PATENT DOCUMENTS

2023/0127439 A1* 4/2023 Liu .......................... G06N 3/08
713/154

FOREIGN PATENT DOCUMENTS

| CN | 105279965 A | 1/2016 |
| CN | 111275482 A | 6/2020 |
| CN | 112907948 A | 6/2021 |

OTHER PUBLICATIONS

English Translation of CN110176141A Title: A POI-based And Traffic Characteristic Of The Traffic Zone Division Method And System Author: Liu et al. Date: Aug. 27, 2019 (Year: 2019).*
Publication No. EP1796058A1 Title: Method And System For Estimating The Arrival Time Of A Public Transport Means At Predetermined Points Of Its Path Author: Gambera et al. Date: Dec. 13, 2007 (Year: 2007).*

(Continued)

*Primary Examiner* — Steven Vu Nguyen
(74) *Attorney, Agent, or Firm* — DITTHAVONG, STEINER & MLOTKOWSKI

(57) ABSTRACT

An approach is provided for spatial aggregation for location based services. The approach involves, for example, determining a plurality of partitions for a geographic area. The approach also involves determining a set of destinations that is common to a first partition and a second partition of the plurality of partitions. The set of destinations are associated with a plurality of trips originating from first partition, the second partition, or a combination thereof. The approach further involves determining a statistical property of the plurality of trips between any of the set of destinations and the first partition, the second partition, or a combination thereof. The approach further involves merging the first partition with the second partition into the traffic analysis zone based on the statistical property.

11 Claims, 14 Drawing Sheets

400

401 — DIVIDE GEOGRAPHIC AREA INTO PARTITIONS (OR TAZ'S)

403 — DETERMINE COMMON DESTINATIONS OF PARTITIONS BEING EVALUATED FOR MERGING

405 — DETERMINE STATISTICAL PROPERTY OF TRIPS (E.G., STD OF ETA)

407 — MERGE PARTITIONS INTO TAZ BASED ON STATISTICAL PROPERTY

409 — PROVIDE MERGED PARTITIONS (TAZ) AS OUTPUT

(56)             References Cited

OTHER PUBLICATIONS

English Translation of CN112750299A Title: Traffic Flow Analyz-
ing Method And Device Author: Wang et al. Date: May 4, 2021
(Year: 2021).*
Haghbayan et al., "Community detection in large scale congested
urban road networks", Research Article, Nov. 29, 2021, 14 pages.
Xu et al., "Community detection based on node influence and
similarity of nodes", Article, Mar. 18, 2022, 15 pages.

* cited by examiner

Figure 1:
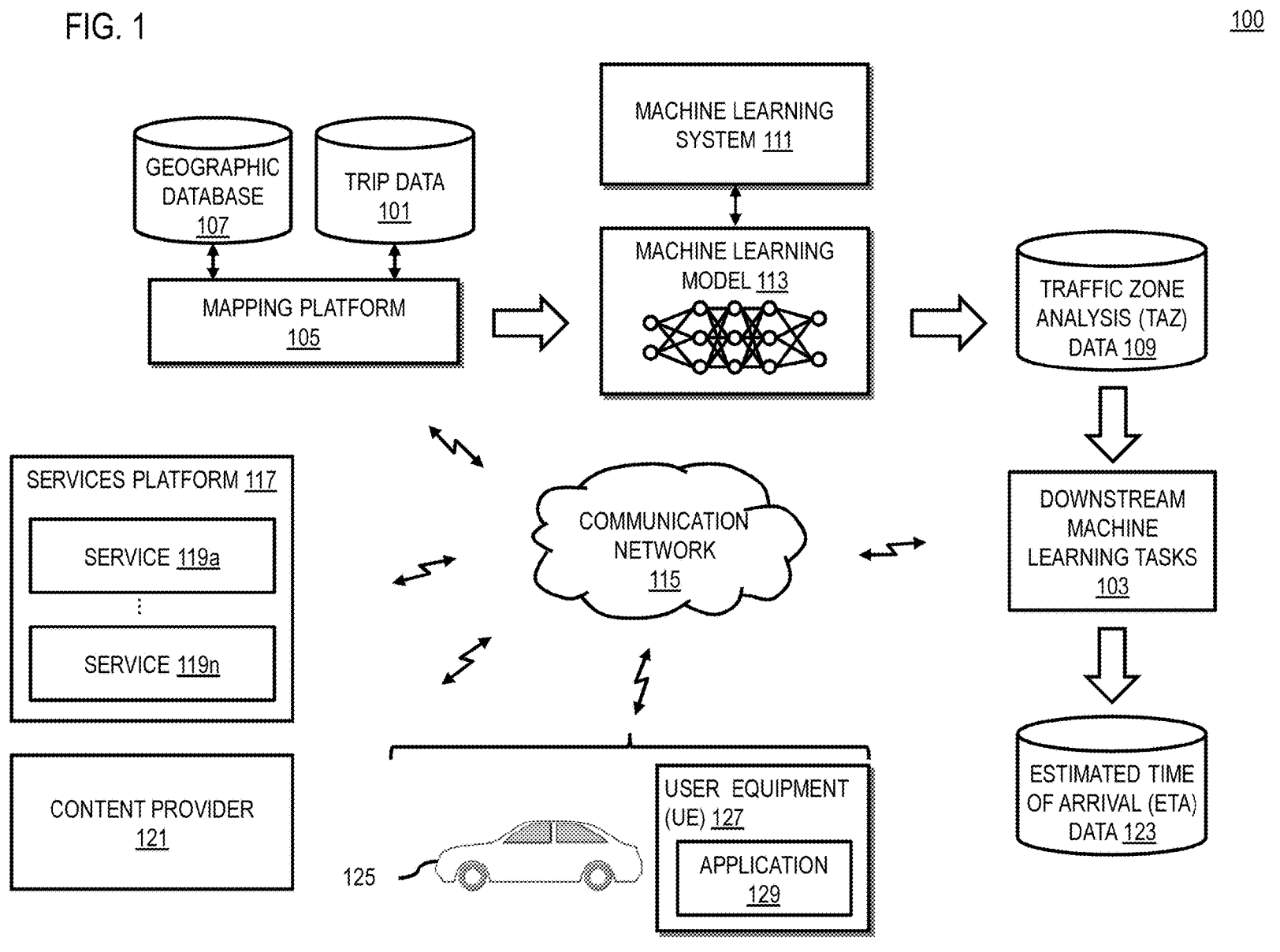

TRAFFIC ZONE ANALYSIS (TAZ) DATA 109

DOWNSTREAM MACHINE LEARNING TASKS 103

ESTIMATED TIME OF ARRIVAL (ETA) DATA 123

MACHINE LEARNING SYSTEM 111

MACHINE LEARNING MODEL 113

COMMUNICATION NETWORK 115

USER EQUIPMENT (UE) 127

APPLICATION 129

125

TRIP DATA 101

GEOGRAPHIC DATABASE 107

MAPPING PLATFORM 105

SERVICES PLATFORM 117

SERVICE 119a

SERVICE 119n

CONTENT PROVIDER 121

SPATIAL AGGREGATION
PROCESS 203

201

205

MAPPING PLATFORM 105

PARTITIONING MODULE 301

AGGREGATION MODULE 303

LEARNING MODULE 305

OUTPUT MODULE 307

400

401 — DIVIDE GEOGRAPHIC AREA INTO PARTITIONS (OR TAZ'S)

403 — DETERMINE COMMON DESTINATIONS OF PARTITIONS BEING EVALUATED FOR MERGING

405 — DETERMINE STATISTICAL PROPERTY OF TRIPS (E.G., STD OF ETA)

407 — MERGE PARTITIONS INTO TAZ BASED ON STATISTICAL PROPERTY

409 — PROVIDE MERGED PARTITIONS (TAZ) AS OUTPUT

FIG. 7

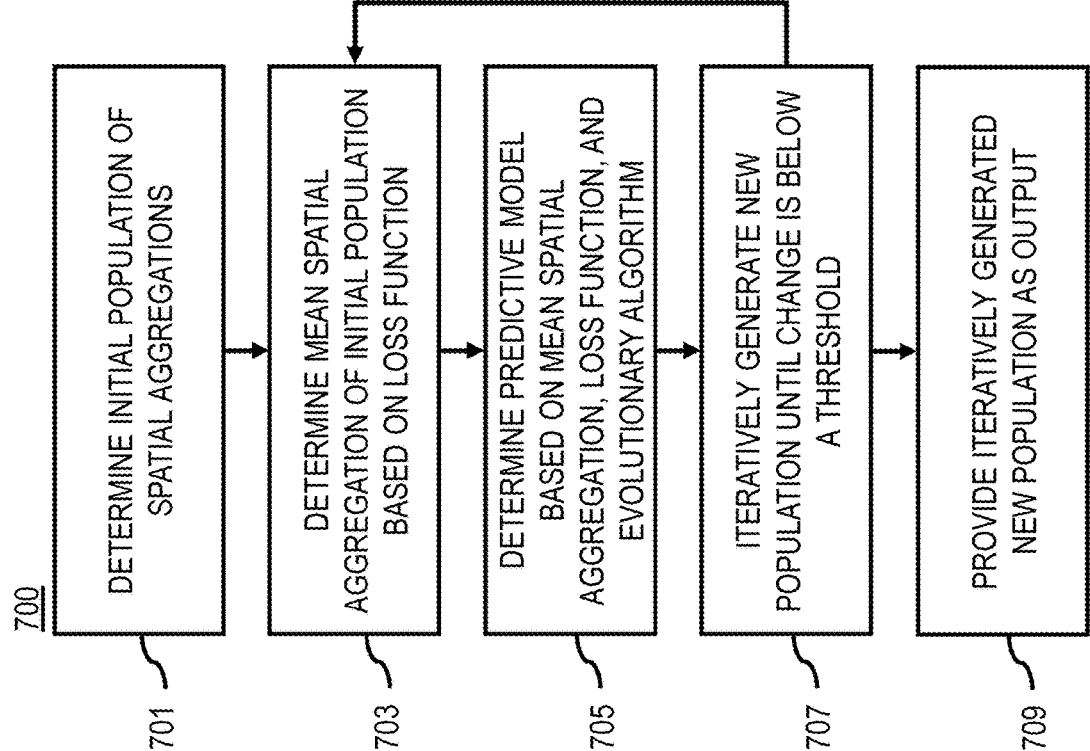

700

701  DETERMINE INITIAL POPULATION OF SPATIAL AGGREGATIONS

703  DETERMINE MEAN SPATIAL AGGREGATION OF INITIAL POPULATION BASED ON LOSS FUNCTION

705  DETERMINE PREDICTIVE MODEL BASED ON MEAN SPATIAL AGGREGATION, LOSS FUNCTION, AND EVOLUTIONARY ALGORITHM

707  ITERATIVELY GENERATE NEW POPULATION UNTIL CHANGE IS BELOW A THRESHOLD

709  PROVIDE ITERATIVELY GENERATED NEW POPULATION AS OUTPUT

FIG. 8

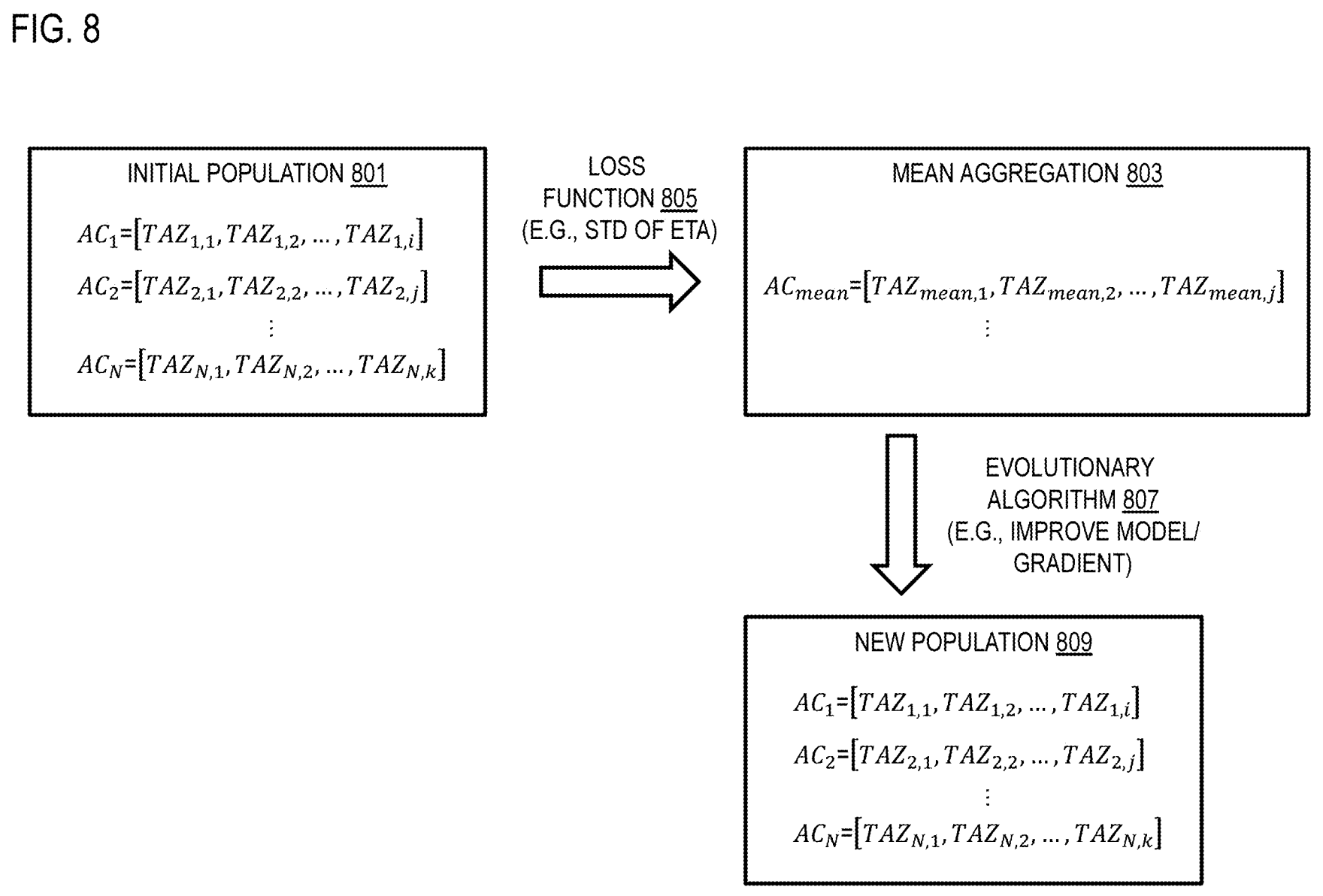

INITIAL POPULATION 801

$$AC_1 = [TAZ_{1,1}, TAZ_{1,2}, \ldots, TAZ_{1,i}]$$

$$AC_2 = [TAZ_{2,1}, TAZ_{2,2}, \ldots, TAZ_{2,j}]$$

$$\vdots$$

$$AC_N = [TAZ_{N,1}, TAZ_{N,2}, \ldots, TAZ_{N,k}]$$

LOSS
FUNCTION 805
(E.G., STD OF ETA)

MEAN AGGREGATION 803

$$AC_{mean} = [TAZ_{mean,1}, TAZ_{mean,2}, \ldots, TAZ_{mean,j}]$$

$$\vdots$$

EVOLUTIONARY
ALGORITHM 807
(E.G., IMPROVE MODEL/
GRADIENT)

NEW POPULATION 809

$$AC_1 = [TAZ_{1,1}, TAZ_{1,2}, \ldots, TAZ_{1,i}]$$

$$AC_2 = [TAZ_{2,1}, TAZ_{2,2}, \ldots, TAZ_{2,j}]$$

$$\vdots$$

$$AC_N = [TAZ_{N,1}, TAZ_{N,2}, \ldots, TAZ_{N,k}]$$

900

DIVIDE GEOGRAPHIC AREA INTO PARTITIONS

901

USE REINFORCEMENT LEARNING AGENT TO MERGE PARTITIONS BASED ON CHANGE OF TRIP PROPERTY

903

PROVIDE TRAFFIC ANALYSIS ZONE AS OUTPUT

905

NODE DATA RECORDS 1003

ROAD SEGMENT DATA RECORDS 1005

POI DATA RECORDS 1007

SPATIAL AGGREGATION DATA RECORDS 1009

HD MAPPING DATA RECORDS 1011

INDEXES 1013

GEOGRAPHIC DATABASE 107

GEOGRAPHIC DATA 1001

FIG. 13

MOBILE TERMINAL 1301

METHOD AND APPARATUS FOR SPATIAL AGGREGATION FOR LOCATION-BASED SERVICES

BACKGROUND

Mapping and navigation service providers are making increasing use of machine learning to provide location-based services. Machine learning, for instance, enables service providers to extract underlying spatial and/or semantic relationships between locations and to classify or make predictions based on those relationships or underlying structure (e.g., make traffic-related inferences such as determining estimated times of arrival (ETAs), travel time, and/or the like). However, training machine learning models to understand these spatial/semantic relationships (or perform traffic-related data analytics based on these relationships) typically use considerable data, time, and computing resources. Accordingly, services providers face significant technical challenges with respect to reducing the computational resources used for locations-based analytics and related computations (e.g., ETA computations).

SOME EXAMPLE EMBODIMENTS

Therefore, there is a need for an approach for spatial aggregation of a geographic area into discrete partitions, e.g., to reduce computation complexity and resource requirements for data analytics (e.g., traffic related analysis or predictions) over those partitions.

According to one embodiment, a method comprises determining a plurality of partitions of a geographic area. The method also comprises determining a set of destinations that is common to a first partition and a second partition of the plurality of partitions. The set of destinations, for instance, are associated with a plurality of trips originating from first partition, the second partition, or a combination thereof. The method further comprises determining a statistical property of the plurality of trips between any of the set of destinations and the first partition, the second partition, or a combination thereof. The method further comprises merging the first partition with the second partition into a traffic analysis zone based on the statistical property. The method further comprises providing the traffic analysis zone as an output in place of the first partition and the second partition.

According to another embodiment, an apparatus comprises at least one processor, and at least one memory including computer program code for one or more computer programs, the at least one memory and the computer program code configured to, with the at least one processor, cause, at least in part, the apparatus to determine a plurality of partitions of a geographic area. The apparatus is also caused to determine a set of destinations that is common to a first partition and a second partition of the plurality of partitions. The set of destinations, for instance, are associated with a plurality of trips originating from first partition, the second partition, or a combination thereof. The apparatus is further caused to determine a statistical property of the plurality of trips between any of the set of destinations and the first partition, the second partition, or a combination thereof. The apparatus is further caused to merge the first partition with the second partition into a traffic analysis zone based on the statistical property. The apparatus is further caused to provide the traffic analysis zone as an output in place of the first partition and the second partition.

According to another embodiment, a non-transitory computer-readable storage medium carries one or more sequences of one or more instructions which, when executed by one or more processors, cause, at least in part, an apparatus to determine a plurality of partitions of a geographic area. The apparatus is also caused to determine a set of destinations that is common to a first partition and a second partition of the plurality of partitions. The set of destinations, for instance, are associated with a plurality of trips originating from first partition, the second partition, or a combination thereof. The apparatus is further caused to determine a statistical property of the plurality of trips between any of the set of destinations and the first partition, the second partition, or a combination thereof. The apparatus is further caused to merge the first partition with the second partition into a traffic analysis zone based on the statistical property. The apparatus is further caused to provide the traffic analysis zone as an output in place of the first partition and the second partition.

According to another embodiment, an apparatus comprises means for determining a plurality of partitions of a geographic area. The apparatus also comprises means for determining a set of destinations that is common to a first partition and a second partition of the plurality of partitions. The set of destinations, for instance, are associated with a plurality of trips originating from first partition, the second partition, or a combination thereof. The apparatus further comprises means for determining a statistical property of the plurality of trips between any of the set of destinations and the first partition, the second partition, or a combination thereof. The method further comprises merging the first partition with the second partition into a traffic analysis zone based on the statistical property. The method further comprises means for providing the traffic analysis zone as an output in place of the first partition and the second partition.

According to one embodiment, a method comprises determining an initial population of spatial aggregation candidates that represents a geographic area. The method also comprises determining a mean spatial aggregation of the initial population by clustering based on a loss function. The method further comprises determining a predictive model based on the mean spatial aggregation, the loss function, and an evolutionary algorithm. The method further comprises iteratively generating a new population of new spatial aggregation candidates using the predictive model until a change between the new population and a previous population is below a threshold value. The method further comprises providing the iteratively generated new population as an output.

According to another embodiment, an apparatus comprises at least one processor, and at least one memory including computer program code for one or more computer programs, the at least one memory and the computer program code configured to, with the at least one processor, cause, at least in part, the apparatus to determine an initial population of spatial aggregation candidates that represents a geographic area. The apparatus is also caused to determine a mean spatial aggregation of the initial population by clustering based on a loss function. The apparatus is further caused to determine a predictive model based on the mean spatial aggregation, the loss function, and an evolutionary algorithm. The apparatus is further caused to iteratively generate a new population of new spatial aggregation candidates using the predictive model until a change between the new population and a previous population is below a threshold value. The apparatus is further caused to provide the iteratively generated new population as an output.

According to another embodiment, a non-transitory computer-readable storage medium carries one or more sequences of one or more instructions which, when executed by one or more processors, cause, at least in part, an apparatus to determine an initial population of spatial aggregation candidates that represents a geographic area. The apparatus is also caused to determine a mean spatial aggregation of the initial population by clustering based on a loss function. The apparatus is further caused to determine a predictive model based on the mean spatial aggregation, the loss function, and an evolutionary algorithm. The apparatus is further caused to iteratively generate a new population of new spatial aggregation candidates using the predictive model until a change between the new population and a previous population is below a threshold value. The apparatus is further caused to provide the iteratively generated new population as an output.

According to another embodiment, an apparatus comprises means for determining an initial population of spatial aggregation candidates that represents a geographic area. The apparatus also comprises means for determining a mean spatial aggregation of the initial population by clustering based on a loss function. The apparatus further comprises means for determining a predictive model based on the mean spatial aggregation, the loss function, and an evolutionary algorithm. The apparatus further comprises means for iteratively generating a new population of new spatial aggregation candidates using the predictive model until a change between the new population and a previous population is below a threshold value. The apparatus further comprises means for providing the iteratively generated new population as an output.

According to one embodiment, a method comprises determining a plurality of partitions of a geographic area. The method also comprises merging a first partition and a second partition of the plurality of partitions into a traffic analysis zone using a reinforcement learning agent. A reward of the reinforcement learning agent is based on a change in a statistical property of a plurality of trips associated with the first partition, the second partition, or a combination thereof. The method further comprises providing the traffic analysis zone as an output in place of the first partition and the second partition.

According to another embodiment, an apparatus comprises at least one processor, and at least one memory including computer program code for one or more computer programs, the at least one memory and the computer program code configured to, with the at least one processor, cause, at least in part, the apparatus to determine a plurality of partitions of a geographic area. The apparatus is also caused to merge a first partition and a second partition of the plurality of partitions into a traffic analysis zone using a reinforcement learning agent. A reward of the reinforcement learning agent is based on a change in a statistical property of a plurality of trips associated with the first partition, the second partition, or a combination thereof. The apparatus is further caused to provide the traffic analysis zone as an output in place of the first partition and the second partition.

According to another embodiment, a non-transitory computer-readable storage medium carries one or more sequences of one or more instructions which, when executed by one or more processors, cause, at least in part, an apparatus to determine a plurality of partitions of a geographic area. The apparatus is also caused to merge a first partition and a second partition of the plurality of partitions into a traffic analysis zone using a reinforcement learning agent. A reward of the reinforcement learning agent is based on a change in a statistical property of a plurality of trips associated with the first partition, the second partition, or a combination thereof. The apparatus is further caused to provide the traffic analysis zone as an output in place of the first partition and the second partition.

According to another embodiment, an apparatus comprises means for determining a plurality of partitions of a geographic area. The apparatus also comprises means for merging a first partition and a second partition of the plurality of partitions into a traffic analysis zone using a reinforcement learning agent. A reward of the reinforcement learning agent is based on a change in a statistical property of a plurality of trips associated with the first partition, the second partition, or a combination thereof. The apparatus further comprises means for providing the traffic analysis zone as an output in place of the first partition and the second partition.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of providing spatial aggregation for location-based services, according to one example embodiment;

FIG. 7 is a flowchart of a process for spatial aggregation based on an evolutionary algorithm, according to one example embodiment;

FIG. 8 is a diagram illustrating an example of using an evolutionary algorithm for spatial algorithm, according to one example embodiment;

FIG. 13 is a diagram of a terminal that can be used to implement an example embodiment of the processes described herein.

DESCRIPTION OF SOME EMBODIMENTS

Figure 2:
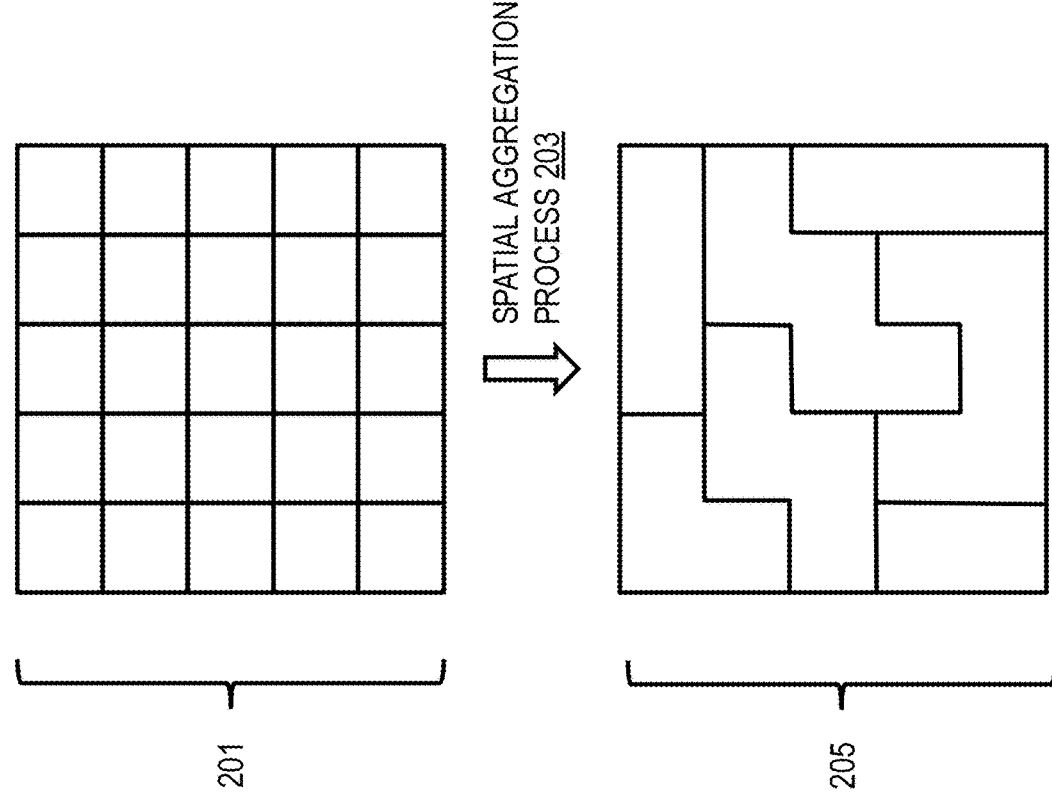
FIG. 2 is a diagram illustrating an example of spatial aggregation for location-based services, according to one example embodiment.

Examples of a method, apparatus, and computer program for spatial aggregation for location-based services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

FIG. 1 is a diagram of a system 100 capable of providing spatial aggregation for location-based services, according to one example embodiment. Many location-based services use trip data 101 to infer traffic or travel related information such as but not limited to estimated times of arrival (ETA) at a destination, travel times, travel distance, traffic volume, traffic speed, historical travel patterns, etc. As used herein, trip data 101 stores at least an origin (O) and a destination (D) associated with a trip traveled within a geographic area of interest. The trip can be performed using any mode of transportation including but not limited to terrestrial vehicles, aerial vehicles, pedestrians, bicycles, etc. Additional data such as, but not limited to, timestamps at the origin and/or destination, speed, route, mode of transport, probe data, etc. may also be included in the trip data 101. Thus, the record of each trip in the trip data 101 includes at least one origin-destination (O-D) pair.

However, because most trips can start at any origin and end at any destination within a geographic area of interest, the total number of possible O-D pairs can be large. With respect to data analysis of these O-D pairs (e.g., via downstream machine learning tasks 103), the large total number of O-D pairs presents significant technical challenges because of limitations on computing resources available to process the large number of O-D pairs. For applications such as machine learning that rely on having multiple observations of the same O-D pair for training, data sparsity can also present significant technical challenges.

To address these technical challenges, the system 100 of FIG. 1 introduces a capability (e.g., via a mapping platform 105) to discretize the digital map data representing a road network or geographic area (e.g., digital map data of a geographic database 107) into partitions (e.g., polygon areas, grid cells, and/or other bounded areas) called Travel-time or Traffic Analysis Zones (TAZs), such that the trips originating from a common TAZ are likely to have similar trip characteristics (e.g., ETAs, travel times, travel distances, etc.) regardless of their exact start locations or origins within the TAZ. It is noted that the terms TAZ and partitions are used synonymously in the various embodiments described herein. In one embodiment, the discretization starts with dividing the road network or geographic area of interest into grid cells or any other kind of initial partitions. Then, the grid cells or partitions are aggregated to create TAZs. This procedure is referred to herein as spatial aggregation.

In one embodiment, spatial aggregation merges cells or partitions in the initial grid together that have similar trip characteristics (e.g., ETAs, travel times, travel distances, etc.) to decrease the total number of possible O-D TAZ pairs. The term "similar," for instance, refer to trip characteristics that meet a similarity threshold or criteria to be classified as "homogenous" such that two partitions or cells can be merged into one TAZ or other larger partition. The resulting merged partitions or TAZs is output as TAZ data 109. By way of example, a reduction of possible O-D pairs can lead to more historical trips per O-D pair, which effectively increases the density of training data and thereby simplifies the predictive task (e.g., associated with downstream machine learning tasks 103). Furthermore, with a reduction of possible O-D pairs, fewer feature values are needed for the same number of historical trips, which saves memory and computation time for training.

However, a high reduction of possible O-D pairs often is based on a TAZ that merges many cells. This usually results in a large variance in a trip characteristics of interest (e.g., ETA) among the trips that originate from the TAZ, which is against the criterion that a TAZ should be homogeneous with respect to one or more selected trip characteristics. It is noted that ETA is provided by way of illustration of a trip characteristics and is not a limitation. It is contemplated that in various example embodiments where ETA is mentioned alone, the example embodiments are also applicable to any other trip characteristic (e.g., travel time, travel distance, travel speed, etc.). Thus, approach of the various embodiments described herein is facing at least two contradictory goals, namely reducing possible O-D pairs versus retaining trip characteristic homogeneity (e.g., ETA homogeneity). The various embodiments of spatial aggregation described herein are aimed at reaching a balance between these two goals.

The approach of the various embodiments described herein differs from conventional community detection algorithms in at least two aspects. First, the various embodiments described herein do not consider modularity as a metric for decision making on merging similar spatial units. Second, the various embodiments described herein do not impose pre-defined geographical regions (e.g., municipalities) as the starting point of spatial aggregation. Instead, the various embodiments described herein utilize the information contained in the trip data 101 and make aggregation decisions based on how the trips are spatially distributed to generate merged TAZ data 109.

In one embodiment, the various embodiments described herein can accept any kind of partitions as initial partitions, whether they are grid cells, administrative zones such as tracts, or partitions based on natural boundaries such as rivers, or a combination of these. In summary, the various embodiments described herein aggregate chunks or partitions of geographical tracts (also referred to as TAZs) into larger units or partitions based on some characteristics of the trips originating from each TAZ. In one embodiment, if the characteristics of two or more TAZs are within a certain margin, threshold, or criteria, the system 100 considers the two or more TAZs identical and merges them into a single TAZ (e.g., for storage and/or use in TAZ data 109). The outcome of the various embodiments of spatial aggregation described herein reduces the total number of TAZs and consequently, reduces the number of data samples that are to be processed downstream. This has an implication for the machine learning algorithm which utilizes this data downstream (e.g., downstream machine learning tasks 103). Specifically, it reduces the number of distinct possibilities the downstream machine learning tasks 103 must at a given time choose from and/or learn.

In one embodiment, the spatial algorithm can be performed heuristically according to the aggregation algorithm (e.g., as described with respect to process 400 of FIG. 4 below). In addition or alternatively, spatial aggregation can be performed using a machine learning system 111 using one or more machine learning models 113. For example, the machine learning system 111 can use a machine learning model 113 based on an evolutionary algorithm to evolve (e.g., using a loss function based on a statistical property of a trip characteristic such as but not limited to the standard deviation of an ETA) an initial population of candidate aggregations representing a geographic area to an evolved or improved population. The term "improved," in one embodiment, refers a new population of aggregation candidate that minimizes loss based on the loss function (e.g., minimizes changes to a standard deviation of ETA between two iterative populations of aggregation candidates). In another embodiment, spatial aggregation can be performed by the machine learning system 111 using a machine learning model 113 based on reinforcement learning where the learning agent uses the loss function (e.g., based on a statistical property of a trip characteristic) as a reward as described in more detail with respect to the process 900 of FIG. 9 below.

As described previously, the system 100 iteratively processes neighboring partitions or TAZs for merging until convergence or other stopping criteria are met. For example, if a predetermined number of iterations fails to result in any additional mergers or all immediate neighboring partitions or TAZs have been processed without merging, then the iterative spatial aggregation process can stop. On reaching the convergence or stopping criterion, the one or more resulting merged TAZs can be output as TAZ data 109. It is contemplated that the TAZ data 109 can be transmitted over a communication network 115 and used for any application, service, or tasks including but not limited to the downstream machine learning tasks 103, a services platform 117, one or more services 119a-119n (also collectively referred to as services 119) of the services platform, a content provider 121, and/or any other component of the system 100 or with connectivity to the system 100.

By way of example, one use case of the merged TAZ data 109 is for predicting the ETA (ETA data 123) of a query trip under the condition that the route to be taken is unknown. Unlike conventional approaches which compute a plausible route for the query trip and predict an ETA based on the computed route, an example embodiment of this use case does not need to compute any route at the time of ETA prediction. Instead, initial partitions a road network are aggregated into ETA homogeneous zones (e.g., TAZs) according to the various embodiments described herein, and pre-computes k-shortest paths between each TAZ pair to accommodate various route choices of travelers. The system 100 then builds a machine learning model using expressive features created based on the k-shortest paths (e.g., as part of a downstream machine learning task 103). These features capture the road characteristics and traffic patterns between a zone pair, without concerning the exact origin/destination location within a zone. The predicted ETA data 123 can then be provided to end user devices such as but not limited to a vehicle 125, user equipment (UE) device 127, and/or location-based application 129 executing on the UE device 127 and/or vehicle 125.

FIG. 2 is a diagram illustrating an example of spatial aggregation for location-based services, according to one example embodiment. As shown, a geographic area has been divided into a five-by-five grid 201 of cells that represent an initial or naïve partitioning of the geographic area. Historical trip data associated with each of the grid cells (i.e., partitions) are collected and analyzed for spatial aggregation (e.g., via spatial aggregation process 203) according to the various embodiments described herein. The spatial aggregation process 203 results in generating merged TAZ data 205 in which the original 25 grid cells/partitions of the grid 201 has been merged into a total of seven TAZs, thereby achieving a 25-to-7 TAZ reduction.

The various embodiments described herein provide for several technical advantages. For instance, as shown in the example of FIG. 2, the various embodiments described herein advantageously provide for efficient reduction in total TAZ count to represent the same geographic area or road network. By way of example, if a region is divided into 100×100 TAZs, then there would be 100 million possible outcomes (e.g., O-D pairs) to perform data analytics (e.g., get ETA predictions) on from the network in the worst case. The various embodiments of spatial aggregation can be used to reduce the amount of TAZs by a significant percentage. For example, a 65% reduction of the 100×100 TAZs can reduce the number of possibilities to predict down to 1.5 million. Such a reduction provides for significant reduction in required resources when training a neural network or performing other downstream machine learning tasks 103 or analytics.

Other technical advantages include but are not limited to:

(1) Data based partitioning—in the various embodiments described herein, there is no need to use municipal regions or any previously defined geographical division or aggregation and instead use the patterns in our data. This is relevant and has a direct consequence on the downstream training and prediction task (e.g., downstream machine learning tasks 103).

(2) Configurable rules for partitioning—The rules and/or criteria for merging partitions (e.g., merging threshold values, specific trip characteristics to use, specific statistical property to use, etc.) are based on the available trip data 101 or related data about the geographic area or road network. As a result, these rules and/or criteria can be modified easily to achieve a new spatial partitioning.

(3) Generalization—for O-D pairs that may not occur in the training data but might occur at the inference stage (e.g., at downstream machine learning tasks 103), if they belong to a TAZ for which the model has been trained the model can still make inferences (e.g., predict an ETA for them).

Figure 3:
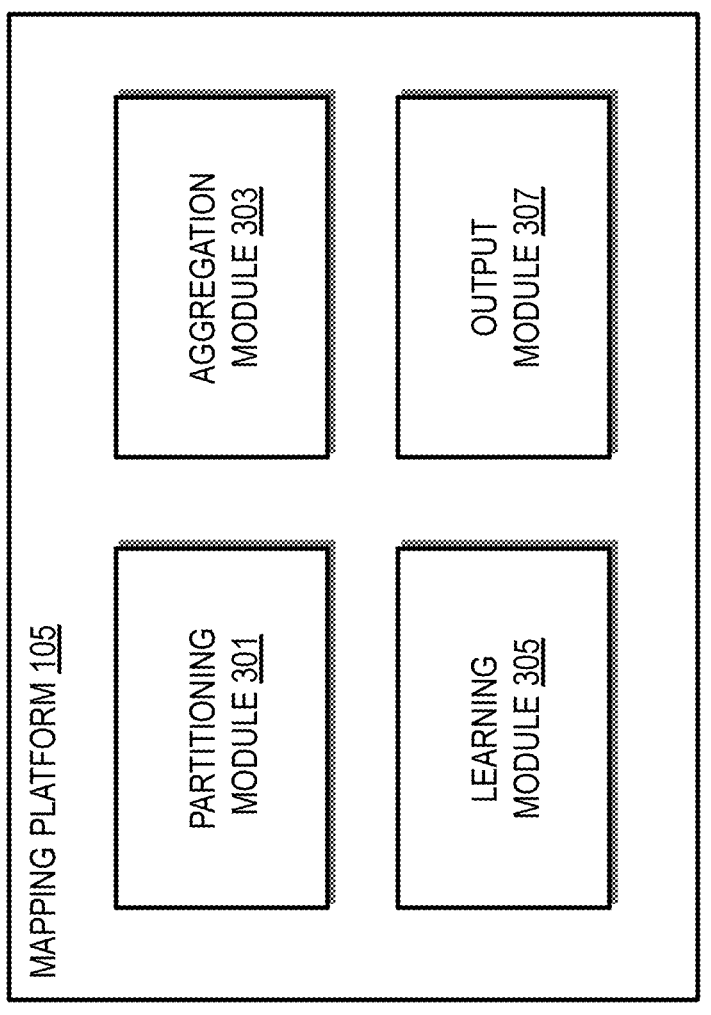
FIG. 3 is a diagram of components of a mapping platform capable of providing a spatial aggregation for location-based services, according to one example embodiment.

FIG. 3 is a diagram of components of a mapping platform capable of providing a spatial aggregation for location-based services, according to one example embodiment. In one embodiment, as shown in FIG. 3, the mapping platform 105 alone or in combination with the machine learning system 111 of the system 100 includes one or more components for spatial aggregation for location-based services according to the various embodiments described herein. It is contemplated that the functions of the components of the mapping platform 105 may be combined or performed by other components of equivalent functionality. As shown, in one embodiment, the mapping platform 105 includes a partitioning module 301, an aggregation module 303, a learning module 305, and an output module 307. The above presented modules and components of the mapping platform 105 can be implemented in hardware, firmware, software, circuitry, or a combination thereof. Though depicted as a separate entity in FIG. 1, it is contemplated that the mapping platform 105 may be implemented as a module of any of the components of the system 100 (e.g., a component of the machine learning system 111, services platform 117, services 119, content providers 121, vehicles 125, UEs 127, and/or the like). In another embodiment, one or more of the modules 301-307 may be implemented as a cloud-based service, local service, native application, or combination thereof. The functions of the mapping platform 105 and modules 301-307 are discussed with respect to figures below.

Figure 4:
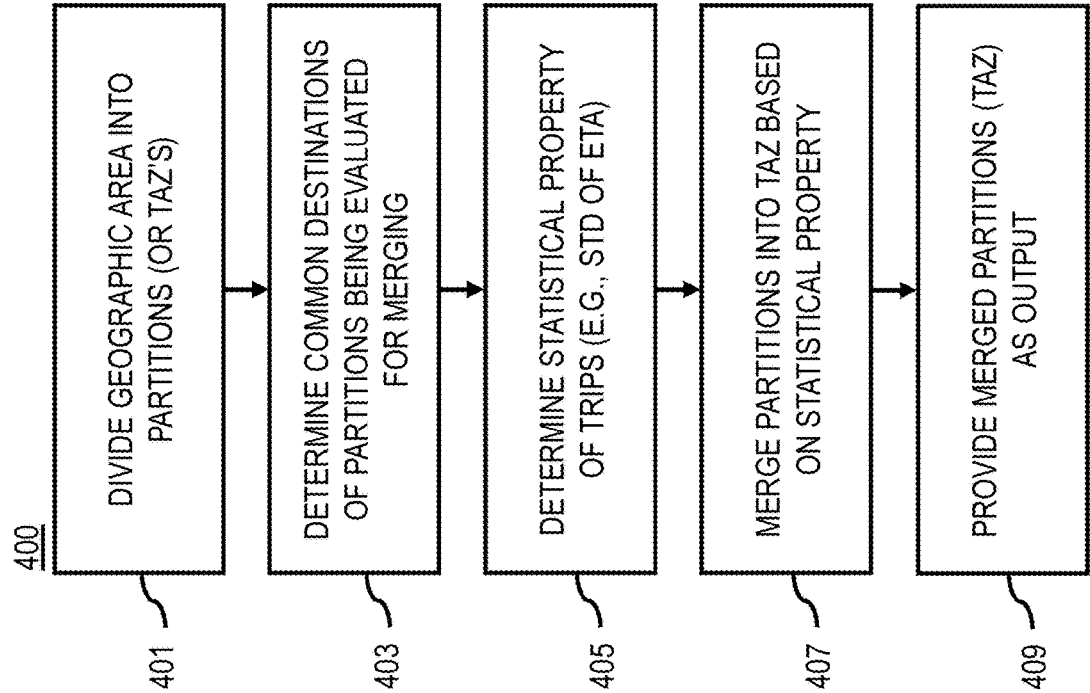
FIG. 4 is a flowchart of a process for spatial aggregation for location-based services, according to one example embodiment.
Figure 12:
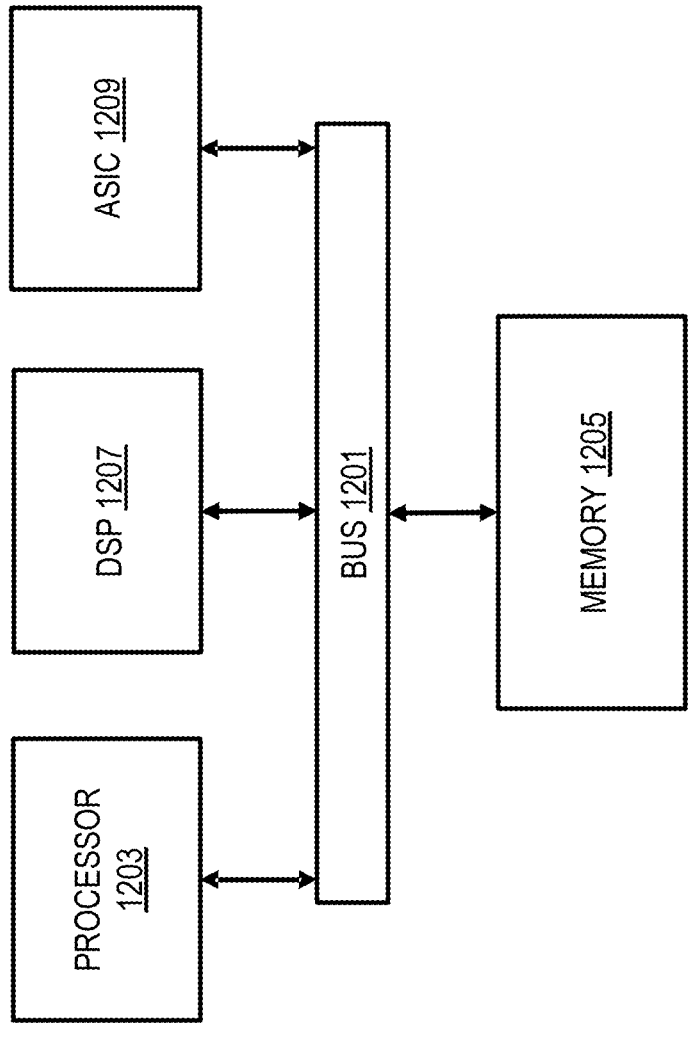
FIG. 12 is a diagram of a chip set that can be used to implement an example embodiment of the processes described herein.

FIG. 4 is a flowchart of a process 400 for spatial aggregation for location-based services, according to one example embodiment. In various embodiments, the mapping platform 105 and/or any of the modules 301-307 may perform one or more portions of the process 400 and may be implemented in, for instance, a chip set including a processor and a memory as shown in FIG. 12. As such, the mapping platform 105 and/or any of the modules 301-307 can provide means for accomplishing various parts of the process 400, as well as means for accomplishing embodiments of other processes described herein in conjunction with other components of the system 100 (e.g., machine learning system 111). Although the process 400 is illustrated and described as a sequence of steps, it is contemplated that various embodiments of the process 400 may be performed in any order or combination and need not include all of the illustrated steps.

In one embodiment, the process 400 for spatial aggregation minimizes the number of aggregated TAZs while keeping the homogeneity of trip characteristics (e.g., ETA homogeneity) within each TAZ above certain level. To achieve this objective, the following steps are illustrated with reference to FIGS. 5A and 5B which are diagrams illustrating example criteria for spatial aggregation, according to one example embodiment.

In step 401, the partitioning module 301 divides a geographic area into a plurality of partitions or otherwise determines a plurality of partitions for a geographic area. It is contemplated that the process 400 can begin with any type of partitioning of the underlying geographic area or road network of interest. The partitioning can be based on existing partitions (e.g., map tiles at a selected zoom level determined from the geographic database 107). In addition or alternatively, when no existing partitioning is available or when existing partitions are not to be used, the partitioning module 301 can create partitions by subdividing the geographic area or road network of interest into a plurality of partitions using any partitioning means. For example, the partitioning module 301 can subdivide the geographic area or road network into uniform grid cells. The size of the initial grid cells can be selected based on the two factors described above (i.e., minimizing the number of partitions/TAZs while maintaining homogeneity of trip characteristics within each partition. After determining or creating the partitions, the partitioning module 301 selects at least two partitions (e.g., a first and second partition) to evaluate for merging.

In step 403, the partitioning module 301 determines a set of destinations that is common to a first partition and a second partition of the plurality of partitions. The set of destinations are associated with a plurality of trips originating from or ending at the first partition, the second partition, or a combination thereof. In other words, the partitioning module 301 retrieves historical trip data (e.g., from trip data 101) for the first and second partitions of data. The retrieved historical trip data can include trips that start from and/or end at the first partition and the second partition (e.g., start or end at any location within the respective geographic areas or road networks of the first and second partitions) for any destination or origin. In some embodiments, the retrieved trips can include those that include the first and/or second partitions as a waypoint on the way to a destination or from another origin/starting point.

Figure 5A:
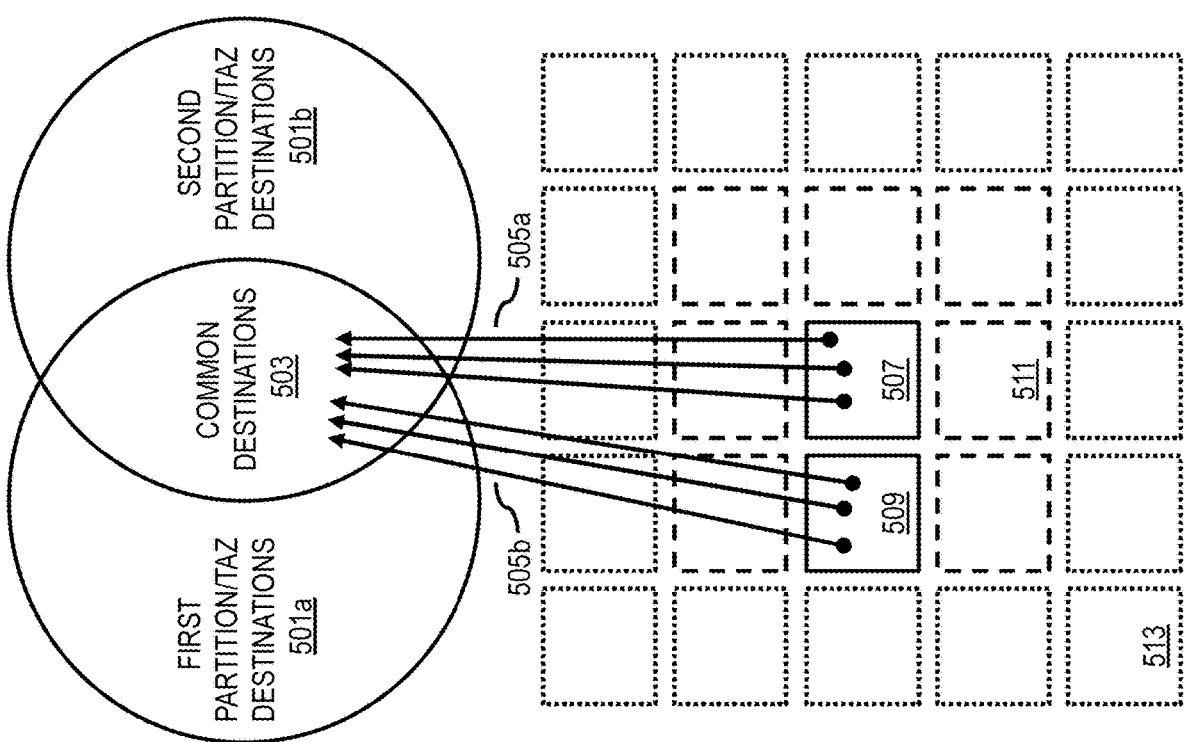
FIGS. 5A and 5B are diagrams illustrating example criteria for spatial aggregation, according to one example embodiment.

In one embodiment, as shown in FIG. 5A a first set of destinations (e.g., first partition/TAZ destinations 501*a*) trips (e.g., trips 505*a*) associated with the first partition (e.g., partition/TAZ 507) and a second set of destinations (e.g., second partition/TAZ destinations 501*b*) of trips (e.g., trips 505*b*) associated with the second partition (e.g., partition/TAZ 509) are obtained. The common destinations for the first and second partitions is the set of destination resulting from an intersection (e.g., common destinations 503) of the first set and the second set. Partition/TAZ 507 is an example of the TAZ currently being evaluated. Partition/TAZ 509 is an example of a candidate neighbor TAZ currently being evaluated for merging with Partition/TAZ 507. Other partitions/TAZs illustrated in FIG. 5A include: (1) other neighboring TAZs that are currently not being evaluated (e.g., indicated by grid cells with medium dash boundaries such as partition/TAZ 511); (2) other TAZs (e.g., indicated by grid cells with fine dash boundaries such as partition/TAZ 513).

In step 405, the aggregation module 303 determines a statistical property of the plurality of trips between any of the set of destinations (e.g., the common destinations determined in step 401 above) and the first partition, the second partition, or a combination thereof. By way of example, the statistical property can be based on an estimated time of arrival associated with a portion of the plurality of trips, the plurality of trips, or a combination thereof. In other words, the trip characteristic can be the ETA of the trips to the common destination or a portion/subset of those trips. Moreover, in one embodiment, the statistical property includes a standard deviation of the estimated time of arrival associated with the portion of the plurality of trips, the plurality of trips, or a combination thereof. It is noted that although various example use cases and embodiments are discussed with respect to the statistical property being a standard deviation of ETAs associated with trips from the first and second partitions, it is contemplated that any other statistical parameter (e.g., mean, maximum, minimum, mode, etc.) and/or any other trip characteristic (e.g., travel time, travel distance, speed, etc.) can be used instead of or in addition to the standard deviation of the ETA to the common destinations.

In one embodiment, the statistical property (e.g., standard deviation (std) of ETA to common destinations) is bounded when merging any two TAZs or partitions. In other words, the aggregation module 303 applies a threshold to ensure homogeneity of the statistical property for the merged TAZs or partitions. For this measure, the aggregation module 303 calculates two standard deviations for each of the common destinations for the two TAZs or partitions in question:

(1) The std of ETA (or any other selected trip characteristic) of trips originating from a TAZ (e.g., first TAZ or partition) to all common destinations; and (2) The std of trips originating from a TAZ (e.g., first TAZ or partition) and its candidate neighbor TAZ (e.g., second TZ or partition) to all common destinations.

In other words, in one embodiment, the statistical property includes at least one of: a first statistical metric for a portion of the plurality of trips originating from the first partition to any of the plurality of destinations, or a second statistical metric for the plurality of trips originating from the first partition and the second partition. The first statistical metric and/or second statistical metric can be any statistical parameter (e.g., std, mean, maximum, mode, etc.) for any selected trip characteristic. It is contemplated that the statistical property can be tuned and need not be limited to a standard deviation of an ETA. As one example, the standard deviation could be replaced by a different statistical measure. As another example, the comparison could happen between the trips originating in each cell individually instead of calculating the statistics of the merged set of trips.

In step 407, the aggregation module 303 merges the first partition with the second partition into the traffic analysis zone based on the statistical property. For example, the aggregation module 303 compares whether the first statistical metric calculated above (e.g., std of ETA for trips originating from the first partition only) and the second statistical metric calculated above (e.g., std of ETA for trips originating from both the first partition and the second partition) are within a threshold value (e.g., std of ETA is less than a maximum threshold value). In this case, the aggregation module 301 is using the different in the two standard deviations as an indicator of homogeneity of the statistical property across the two partitions/TAZs being evaluated. If the difference of these two standard deviations (or other two statistical metrics) is within a threshold (e.g., indicating homogeneity between the two partition/TAZ s), then this criterion is met and the two partitions/TAZs being evaluated can be merged into a single larger partition/TAZ (e.g., to minimum the number of TAZs that cover a given geographic area.

In other words, the first partition and the second partition (e.g., partitions being evaluated) are merged into a traffic analysis zone based on determining that the first statistical metric and the second statistical metric (e.g., respectively corresponding to each partition being evaluated) differ by less than a threshold value.

Figure 5B:
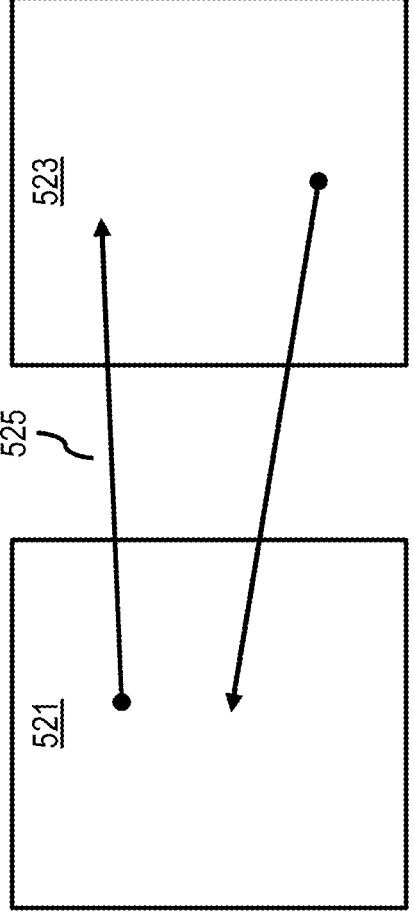

In one embodiment, the aggregation module 303 can apply an inter-TAZ or inter-partition trip count as a second threshold or criterion. Any two partitions/TAZs that pass the first criterion (e.g., statistical property criterion as illustrated in the various embodiments above) is then evaluated against a second criterion that the number of trips between the two partitions/TAZs being evaluated is below a threshold. For example, as shown in the example of FIG. 5B, a first partition/TAZ 521 is being evaluated for merging with a second partition/TAZ 523. The aggregation module 303 retrieves trip data comprising inter-partition trips 525 that start from anywhere in partition/TAZ 521 and ends anywhere in partition/TAZ 523 or vice versa. The aggregation module 303 counts the number of inter-partition trips 525 between the two partitions/TAZs 521 and 523 and will merge only if the count is below a threshold. This criterion makes sure that two partitions/TAZs that are statistically significant are not merged.

In summary, for the second merging criterion, the aggregation module 303 determines a number of inter-partition trips between the first partition and the second partition (e.g., partitions/TAZs being evaluate). The merging of the first partition and the second partition into the traffic analysis zone is then further based on the number of inter-partition trips. For example, first partition and the second partition are merged based on determining that the number of inter-partition trips is below a threshold value.

In one embodiment, the aggregation module 303 iteratively processes one or more neighboring partitions to merge into the traffic analysis zone until a stopping criterion is met. For example, the stopping criterion includes failing to merge the one or more neighboring partitions for a threshold number of consecutive iterations. In short, the process 400 works iteratively to create a spatial aggregation. For each partition/TAZ, the process 400 sequentially evaluates its neighboring partitions/TAZs (e.g., partitions/TAZs immediately adjoining the partition/TAZ being evaluated) against the merging criteria of the various embodiments described above. If the evaluation succeeds (e.g., the criteria are met), then the two partitions/TAZs being evaluated are merged. In one embodiment, convergence is reached and the iterations are stopped when the aggregation fails to merge any partition/TAZ pair for a fixed number of consecutive iterations.

Table 1 below illustrates pseudocode for implementing one embodiment of the spatial aggregation of process 400 (e.g., an embodiment that uses std of ETAs as the statistical property for aggregation).

arrival, according to one example embodiment. In this example, a merged TAZ data 109 (e.g., generated according to the various embodiments described herein) is generated for geographic area 601. A user requests an ETA for a trip starting at origin 603 located in merged TAZ 605 and ending at destination 607 in merged TAZ 609. The system 100 determines precomputed trip ETA 611 for the O-D pair between TAZ 605 and TAZ 609 (e.g., precomputed travel time between TAZ 605 and TAZ 609 plus the current time) without having to generate a route between origin 603 and destination 607, thereby saving time and resources that would have otherwise been used for route computation. The trip ETA 611 is then presented in a user interface 613 of a user device as a message indicating "Your estimated time of arrival is: 5:45 pm."

TABLE 1

Ensure: Initialize threshold for standard deviation of ETAs for a common destination as
    TH1.
Ensure: Initialize threshold for inter-TAZ trips as TH2.
 1: Choose a TAZ that has not been evaluated yet.   Call this current_TAZ.
 2: For current_TAZ get a list of all neighbors, call them set A.
 3: For current_TAZ enumerate all of its destinations, call this set B.
 4:
 5: for TAZs (A$_1$, A$_2$, ...) in set A do
 6:   Calculate all destinations of TAZ A$_i$.   Call them set C.
 7:   Calculate intersection of sets B and C and store them in set D.
 8:
 9:   for all destinations (D$_1$, D$_2$, ...) in set D do
10:     Calculate the standard deviation of the ETAs for trips originating from
current_TAZ to D$_i$.   Call it SD1.
11:     Calculate standard deviation of ETAs for trips originating from current_TAZ and
A$_i$ combined. Call it SD2.
12:     Calculate the percentage difference between SD1 and SD2. If lower than TH1,
mark it for merging.
13:     Calculate the number of trips in between current_TAZ and A$_i$. If this number is
greater than TH2, unmark it (even if it was already marked for merging).
14:     Keep the result of the previous step in a list L1.
15:   end for
16:   If ALL items in list L1 have been marked for merging, then current_TAZ and the
TAZ A$_i$ are merged into a single TAZ, i.e., current_TAZ = current_TAZ + A$_i$.
17: end for
18: Go to step 1 and continue till no more TAZs are left to
be evaluated or convergence criteria reached.

In step 409, the output module 307 provides the traffic analysis zone as an output in place of the first partition and the second partition. In other words, the partition/TAZ resulting from the merger of the first and second partitions (along with any other partition merger results) (e.g., TAZ data 109) are provided to replace the initial partitions.

In one example use case, digital map data of a geographic database is discretized based on the output. For example, road network data and/or any other map data are organized or indexed according to the output TAZ data 109. In one embodiment, the merged partitions/TAZs in the TAZ data 109 are used a boundaries for defining discrete units of the geographic area or road network represented in the map data (e.g., map data of the geographic database 107).

In another example use case, the output module 307 creates one or more traffic analysis zone pairs based on the output, and then processes the one or more traffic analysis zone pairs using machine learning to determine a traffic attribute. For example, the traffic attribute can be an ETA for a trip. In this use case, TAZ pairs can be determined and used to represent possible O-D pairs of a trip for computing ETA. The ETA can be precomputed for each O-D pair so that route between the O-D pairs need not be known.

Figure 6:
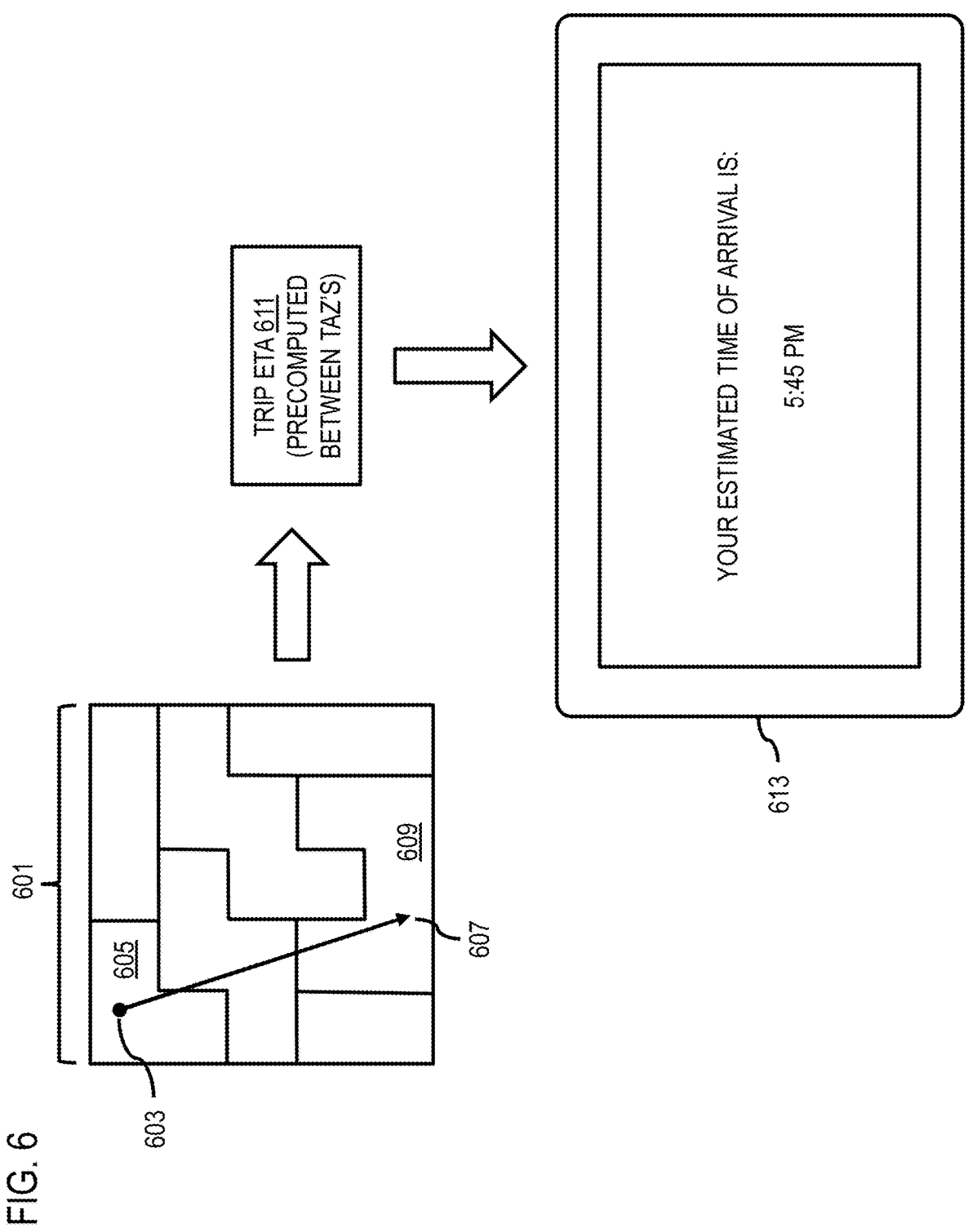
FIG. 6 is a diagram illustrating an example of using spatial aggregation for determining an estimated time of arrival, according to one example embodiment.

FIG. 6 is a diagram illustrating an example of using spatial aggregation for determining an estimated time of FIGS. 7-9 below provide example embodiments of spatial aggregation based on machine learning that can be used in addition to or as an alternate to the spatial aggregation of the process 400 of FIG. 4.

FIG. 7 is a flowchart of a process 700 for spatial aggregation based on an evolutionary algorithm, according to one example embodiment. In various embodiments, the mapping platform 105 and/or any of the modules 301-307 may perform one or more portions of the process 700 and may be implemented in, for instance, a chip set including a processor and a memory as shown in FIG. 12. As such, the mapping platform 105 and/or any of the modules 301-307 can provide means for accomplishing various parts of the process 700, as well as means for accomplishing embodiments of other processes described herein in conjunction with other components of the system 100 (e.g., machine learning system 111). Although the process 700 is illustrated and described as a sequence of steps, it is contemplated that various embodiments of the process 700 may be performed in any order or combination and need not include all of the illustrated steps.

The approach of the process 700 is to create creating a population of aggregations and finding out which one is better/closer to a global metric or reaches optimal division.

Optimal (Ideally) in this context is defined as a spatial aggregation that makes the task of the downstream neural network simpler (e.g., downstream machine learning task 103). This is a posterior for which any distribution cannot be derived because any distribution of the prior is not known. The prior is a distribution, sampling from which "a" spatial aggregation can be obtained. The problem of finding an optimal spatial aggregation is exponential in the number of atomic regions/tracts/partitions/TAZs that mapping platform 105 has at its disposal and is an NP-hard problem.

In one embodiment, the process 700 solves this problem via a population-based evolutionary approach. Specifically, the mapping platform 105 can consider starting with a population of aggregation candidates which follow some aggregation rules (e.g., the TAZ data 109 output of the various embodiments of spatial aggregation described above or any other aggregation starting point such as but not limited to an existing division based on municipal regions) but have some minor differences (e.g., applying different aggregation thresholds for maximum acceptable standard deviation in the ETAs as per the ground truth data when aggregation is performed). These differences lead to slightly or completely different final spatial aggregation patterns. At this point, the mapping platform 105 determines a mean of the population (e.g., based on a clustering of the aggregation candidates in a population) and find a gradient for an evolutionary machine learning model that moves the general population in that direction of "evolution." It is noted that that this population can have a few clusters or one cluster, and it is dependent on the evolutionary algorithm to handle that kind of heterogeneity in the population. Furthermore, the mapping platform 105 can select a sharp metric to steadily converge with the evolutionary algorithm.

To this end, the mapping platform 105 can use an evolutionary algorithm such as but not limited to covariance matrix adaptation evolution strategy (CMA-ES) or equivalent. CMA-ES uses a clustering algorithm to have its parameters limited to a few thousands. By way of example, CMA-ES is an evolutionary algorithm for difficult non-linear non-convex black-box optimization problems in continuous domain. CMA-ES can be applied to unconstrained or bounded constraint optimization problems, and search space dimensions between three and a hundred. CMA-ES is a second order approach estimating a positive definite matrix within an iterative procedure (more precisely: a covariance matrix, that is, on convex-quadratic functions, closely related to the inverse Hessian).

CMA-ES has several invariance properties. Two of them, inherited from the plain evolution strategy, are (i) invariance to order preserving (i.e. strictly monotonic) transformations of the objective function value (that is, e.g., $\|x\|^2$ and $3\|x\|^{0.2}$-100 are equivalent objective functions with identical performance of CMA-ES), and (ii) invariance to angle preserving (rigid) transformations of the search space (including rotation, reflection, and translation), if the initial search point is transformed accordingly. Invariances are highly desirable: they imply uniform behavior on classes of functions and therefore imply the generalization of empirical results.

The CMA-ES does not require a tedious parameter tuning for its application. For the application of CMA-ES, an initial solution, an initial standard deviation (step-size, variables are defined such that the same standard deviations can be reasonably applied to all variables).

Various embodiments of the steps an evolutionary algorithm of the process 700 for spatial aggregation are discussed below.

In step 701, the learning module 305 chooses or otherwise determines an initial population of spatial aggregation candidates that represents a geographic area. In one embodiment, each spatial aggregation candidate comprises a different set of traffic analysis zones or partitions representing the geographic area. In other words, each spatial aggregation candidate includes a complete set of TAZs/partitions that cover the entire geographic area or road network of interest. Each aggregation candidate will have differences relative to other aggregation candidates in the population. In one embodiment, as previously discussed, the initial population can include spatial aggregation candidates that have been generated according to the spatial aggregation of the various embodiments of process 400 of FIG. 4. The mapping platform 105 develops the population to the convergence point.

FIG. 8 is a diagram illustrating an example of using an evolutionary algorithm for spatial algorithm, according to one example embodiment. As shown, the initial population 801 comprise a set of aggregation candidates $AC_1$-$AC_N$, where N is the number of aggregation candidates in a population. Each aggregation candidate $AC_1$-$AC_N$ consists of a set of partitions or TAZs varying in number from i, j, and k. In other words, each aggregation candidate $AC_1$-$AC_N$ can include any number of TAZs (e.g., polygons boundaries) of varying sizes and locations within the geographic area or road network associated with the population.

Once the initial population has converged, in step 703, the learning module 305 determines a mean (or center) spatial aggregation of the initial population. In one embodiment, the mean or center spatial aggregation 803 can be determined by clustering or equivalent algorithm based on a loss function 805. For example, the centers may be consolidated into candidate aggregation via a clustering algorithm. This clustering algorithm provides a loss function. In one embodiment, the loss function is based on a statistical property of a plurality of trips between any of the spatial aggregation candidates. The statistical property, for instance, is based on an estimated time of arrival of the plurality of trips. Then referring back to the determining of the initial population in step 701, the initial population, any new population, or a combination thereof is determined based on a different threshold for a maximum standard deviation of the estimated time of arrival of the plurality of trips. In other words, a different threshold can be applied to generate each spatial aggregation in the population to create variation in between spatial aggregations (e.g., different merged partitions/TAZ s in each spatial aggregation candidate).

In step 705, the learning module 305 improves the model that predicts (e.g., clustering) actions using the loss function. In other words, the learning module 305 determines a predictive model and/or its model parameters based on the mean spatial aggregation, the loss function, and an evolutionary algorithm (e.g., CMA-ES or equivalent indicated as evolutionary algorithm 807 in FIG. 8).

In step 707, the learning module 305 then iteratively generates a new population (e.g., new population 809) of new spatial aggregation candidates using the predictive model until a change between the new population and a previous population (or a change in the population centers) is below a threshold value. For example, a change can be based on the similarity between the numbers, sizes, boundaries, and/or other partition characteristics between the partitions/TAZs in one population versus another. If the change or difference between any two successive iterations of the population is below a threshold value, then the iterative process can end.

In one embodiment, the learning module 305 determine a new mean spatial aggregation of the new population and uses the new mean spatial aggregation as traffic analysis zones for the geographic area.

In step 709, the output module 307 provides the iteratively generated new population and/or its mean spatial aggregation as an output.

Figure 9:
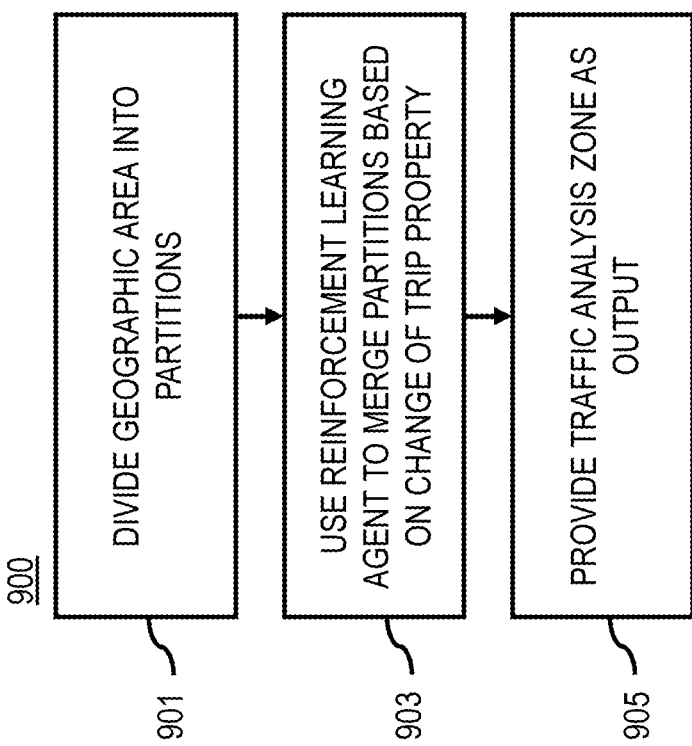
FIG. 9 is a flowchart of a process for spatial aggregation based on reinforcement learning, according to one example embodiment.

FIG. 9 is a flowchart of a process 900 for spatial aggregation based on reinforcement learning, according to one example embodiment. In various embodiments, the mapping platform 105 and/or any of the modules 301-307 may perform one or more portions of the process 900 and may be implemented in, for instance, a chip set including a processor and a memory as shown in FIG. 12. As such, the mapping platform 105 and/or any of the modules 301-307 can provide means for accomplishing various parts of the process 900, as well as means for accomplishing embodiments of other processes described herein in conjunction with other components of the system 100 (e.g., machine learning system 111). Although the process 900 is illustrated and described as a sequence of steps, it is contemplated that various embodiments of the process 900 may be performed in any order or combination and need not include all of the illustrated steps.

In one embodiment, the process 900 provides an approach that uses Deep Reinforcement Learning (RL) to come up with an intelligent way for spatial partitioning for a certain task. For example, the various embodiments of the approach use a modified RL objective that does not look at discounted future rewards but at the immediate rewards. This strategy also proceeds in a step by step fashion but relies on the "learning" of the agent (e.g., powered by a neural network approximated Q-function) to make a decision at aggregating initial partitions (e.g., grid cells or tracts).

In one embodiment, the RL model comprises learning agents that take actions in an environment to maximize a cumulative reward and/or minimize a cumulative penalty. Examples of the actions and states of the learning agent include but are not limited to:

Action—The action of combining two nodes (e.g., partitions, TAZs, tracts, or equivalent) in the geographic region or road network of interest which produces a new state and also produces a reward (e.g., the change in the mean/std of the ETA or other selected statistical property).

State—The new partitioning or spatial aggregation that an action leads to among the space of possible partitions or spatial aggregations.

The model generates a reward that is not dependent on all the rewards in the roll-out, so the discount factor is zero. This particular aspect can be challenged for our use case since adding more regions, if it leads to a worsening of the ETA, then the agent must be signaled (penalized) for continuing such a 'policy'. The state space is enormous since there is an exponentially large number of states possible in the order of the number of initial partitions (individual nodes of the graph).

Various embodiments of the steps a reinforcement learning algorithm of the process 900 for spatial aggregation are discussed below.

In step 901, the learning module 305 divides a geographic area into a plurality of partitions or otherwise determines a plurality of partitions for a geographic area. This partitioning step can be performed, for instance, as described with respect to step 401 of the process 400 of FIG. 4.

In step 903, the learning module 305 merges a first partition and a second partition of the plurality of partitions into a traffic analysis using a reinforcement learning agent. In one embodiment, a reward of the reinforcement learning agent is based on a change in a statistical property of a plurality of trip associated with the first partition, the second partition, or a combination thereof. The reward is applied as an immediate reward.

In one embodiment, the statistical property is based on a standard deviation of an estimated time of arrival of the plurality of trips. In addition or alternatively, the statistical property can be based on any other statistical metric including but not limited to a mean, maximum, mode, etc., and the selected trip characteristics can be any other characteristics including but not limited to travel time, travel distance, speed, etc.

In one embodiment, instead of a reward, the reinforcement learning agent applies a penalty based on determining that the merging of the first partition and the second partition results in an increase of the standard deviation of the estimated time of arrival.

In step 905, the output module 307 provides the traffic analysis zone (e.g., resulting from the reinforcement learning algorithm) as an output in place of the first partition and the second partition.

Returning to FIG. 1, as shown, the system 100 includes the mapping platform 105 operating alone or in combination with the machine learning system 111 for providing spatial aggregation for location-based services according to the various embodiments described herein. In one embodiment, the machine learning system 111 includes or is otherwise associated with one or more machine learning models 113 (e.g., neural networks or other equivalent network using algorithms such as but not limited to an evolutionary algorithm, reinforcement learning, or equivalent) for performing spatial aggregation.

In one embodiment, the mapping platform 105 has connectivity over the communication network 115 to the machine learning system 111, services platform 117 that provides one or more services 119 that can use TAZ data 109 for downstream machine learning tasks 103 to perform one or more functions. By way of example, the services 119 may be third party services and include but is not limited to mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 119 uses TAZ data 109 to provide services 119 such as navigation, mapping, other location-based services, etc. to the vehicles 125, UEs 127, and/or applications 129 executing on the UEs 127.

In one embodiment, the mapping platform 105 may be a platform with multiple interconnected components. The mapping platform 105 may include multiple servers, intelligent networking devices, computing devices, components, and corresponding software for providing spatial aggregation for location-based services according to the various embodiments described herein. In addition, it is noted that the mapping platform 105 may be a separate entity of the system 100, a part of the machine learning system 111, one or more services 119, a part of the services platform 117, or included within components of the vehicles 125 and/or UEs 127.

In one embodiment, content providers 121 may provide content or data (e.g., including geographic data, etc.) to the geographic database 107, mapping platform 105, machine learning system 111, the services platform 117, the services 119, the vehicles 125, the UEs 127, and/or the applications 129 executing on the UEs 127. The content provided may be any type of content, such as machine learning models, trip data, map embeddings, map content, textual content, audio content, video content, image content, etc. In one embodiment, the content providers 121 may provide content that may aid in providing spatial aggregation for location-based services according to the various embodiments described herein. In one embodiment, the content providers 121 may also store content associated with the mapping platform 105, machine learning system 111, geographic database 107, services platform 117, services 119, and/or any other component of the system 100. In another embodiment, the content providers 121 may manage access to a central repository of data, and offer a consistent, standard interface to data, such as a repository of the geographic database 107.

In one embodiment, the vehicles 125 and/or UEs 127 may execute software applications 129 to use or access TAZ data 109 or data derived therefrom (e.g., ETA data 123) according the embodiments described herein. By way of example, the applications 129 may also be any type of application that is executable on the vehicles 125 and/or UEs 127, such as autonomous driving applications, mapping applications, location-based service applications, navigation applications, device control applications, content provisioning services, camera/imaging application, media player applications, social networking applications, calendar applications, and the like. In one embodiment, the applications 129 may act as a client for the mapping platform 105 and perform one or more functions associated with providing spatial aggregation for location-based services alone or in combination with the mapping platform 105.

By way of example, the vehicles 125 and/or UEs 127 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicles 125 and/or UEs 127 can support any type of interface to the user (such as "wearable" circuitry, etc.). In one embodiment, the vehicles 125 and/or UEs 127 may be associated with or be a component of a vehicle or any other device.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 105, machine learning system 111, services platform 117, services 119, vehicles 125 and/or UEs 127, and/or content providers 121 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
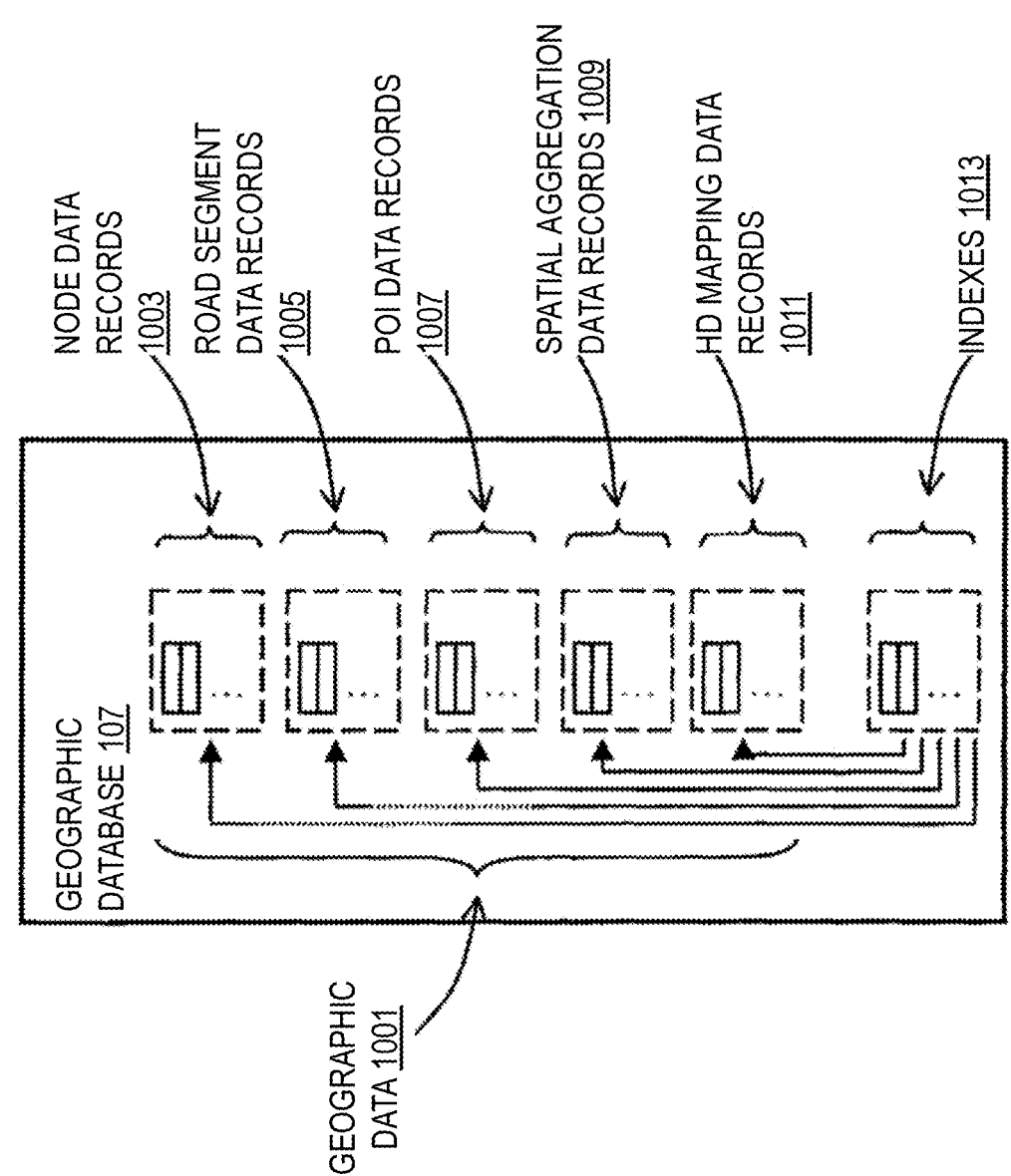
FIG. 10 is a diagram of a geographic database, according to one example embodiment.

FIG. 10 is a diagram of a geographic database, according to one embodiment. In one embodiment, the geographic database 107 includes geographic data 1001 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 1001. In one embodiment, the geographic database 107 include high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 107.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 107 follows certain conventions. For example, links do not cross themselves and do not cross each other except at a node. Also, there are no duplicated shape points, nodes, or links. Two links that connect each other have a common node. In the geographic database 107, overlapping geographic features are represented by overlapping polygons. When polygons overlap, the boundary of one polygon crosses the boundary of the other polygon. In the geographic database 107, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 107 includes node data records 1003, road segment or link data records 1005, POI data records 1007, spatial aggregation data records 1009, HD mapping data records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 107. In one embodiment, the indexes 1013 may be used to quickly locate data without having to search every row in the geographic database 107 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points (for example, representing intersections or an end of a road) corresponding to the respective links or segments of the road segment data records 1005. The road link data records 1005 and the node data records 1003 represent a road network, such as used by vehicles, cars, and/or other entities. Alternatively, the geographic database 107 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 107 can include data about the POIs and their respective locations in the POI data records 1007. The geographic database 107 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 107 can also include spatial aggregation data records 1009 for storing initial partitions/TAZs, merged partitions/TAZs, machine learning models, machine learning model parameters, and/or any other related data that is used or generated according to the embodiments described herein. By way of example, the spatial aggregation data records 1009 can be associated with one or more of the node records 1003, road segment records 1005, and/or POI data records 1007 to associate the spatial aggregations with specific places, POIs, geographic areas, and/or other map features. In this way, the spatial aggregation data records 1009 can also be associated with the characteristics or metadata of the corresponding records 1003, 1005, and/or 1007.

In one embodiment, as discussed above, the HD mapping data records 1011 model road surfaces and other map features to centimeter-level or better accuracy. The HD mapping data records 1011 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 1011 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 107 can be maintained by the content provider 121 in association with the services platform 117 (e.g., a map developer). The map developer can collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 107 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicles 125 and/or UEs 127. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing spatial aggregations for location-based services may be advantageously implemented via software, hardware (e.g., general processor, Digital Signal Processing (DSP) chip, an Application Specific Integrated Circuit (ASIC), Field Programmable Gate Arrays (FPGAs), etc.), firmware, circuitry, or a combination thereof. Such exemplary hardware for performing the described functions is detailed below.

Figure 11:
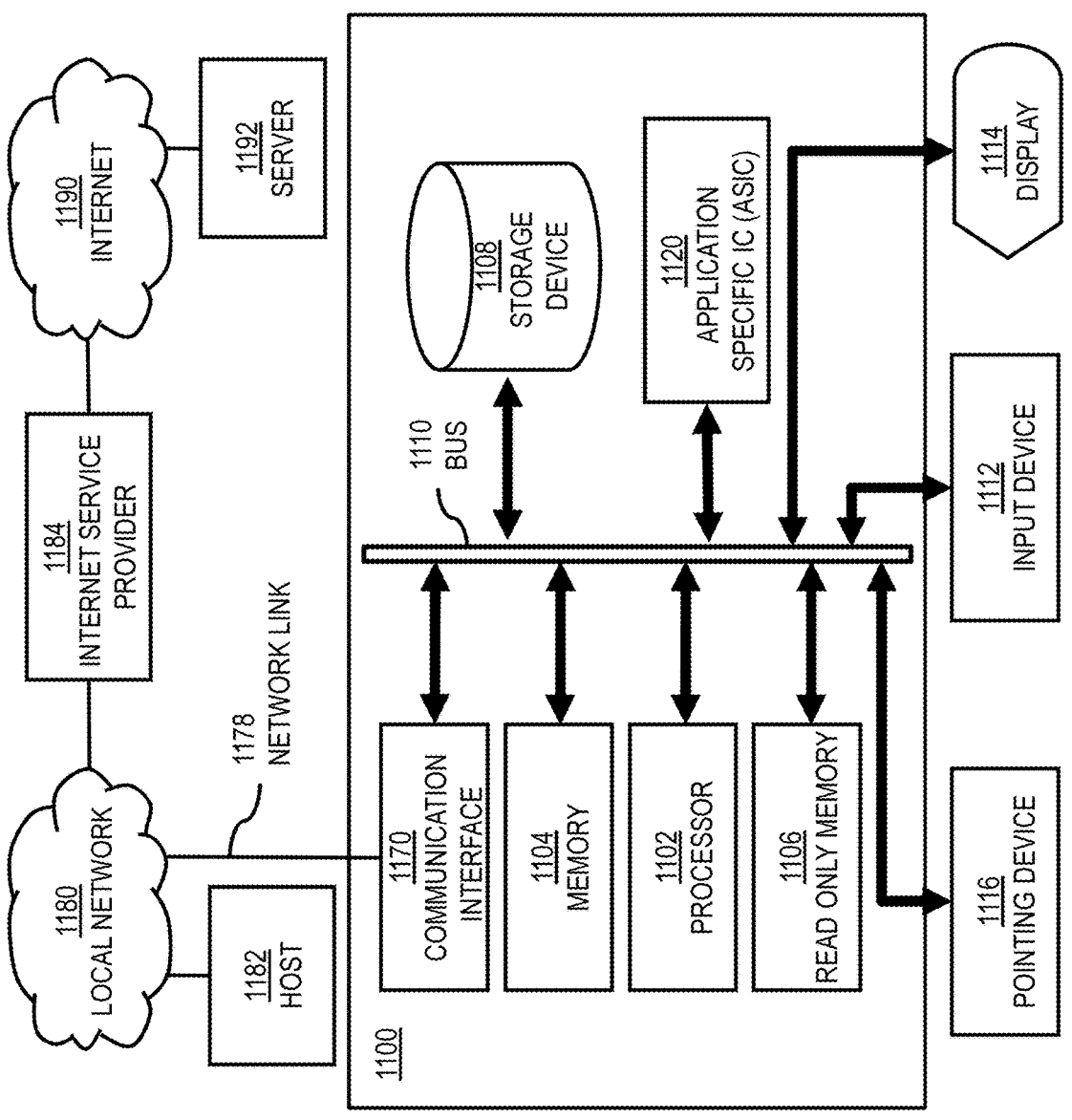
FIG. 11 is a diagram of hardware that can be used to implement an example embodiment of the processes described herein.

FIG. 11 illustrates a computer system 1100 upon which an embodiment of the invention may be implemented. Computer system 1100 is programmed (e.g., via computer program code or instructions) to provide spatial aggregation for location-based services as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing spatial aggregation for location-based services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing spatial aggregation for location-based services. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing spatial aggregation for location-based services, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 115 for providing spatial aggregation for location-based services.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide spatial aggregation for location-based services as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide spatial aggregation for location-based services. The memory 1205 also stores the data associated with or generated by the execution of the inventive steps.

Figure 13:
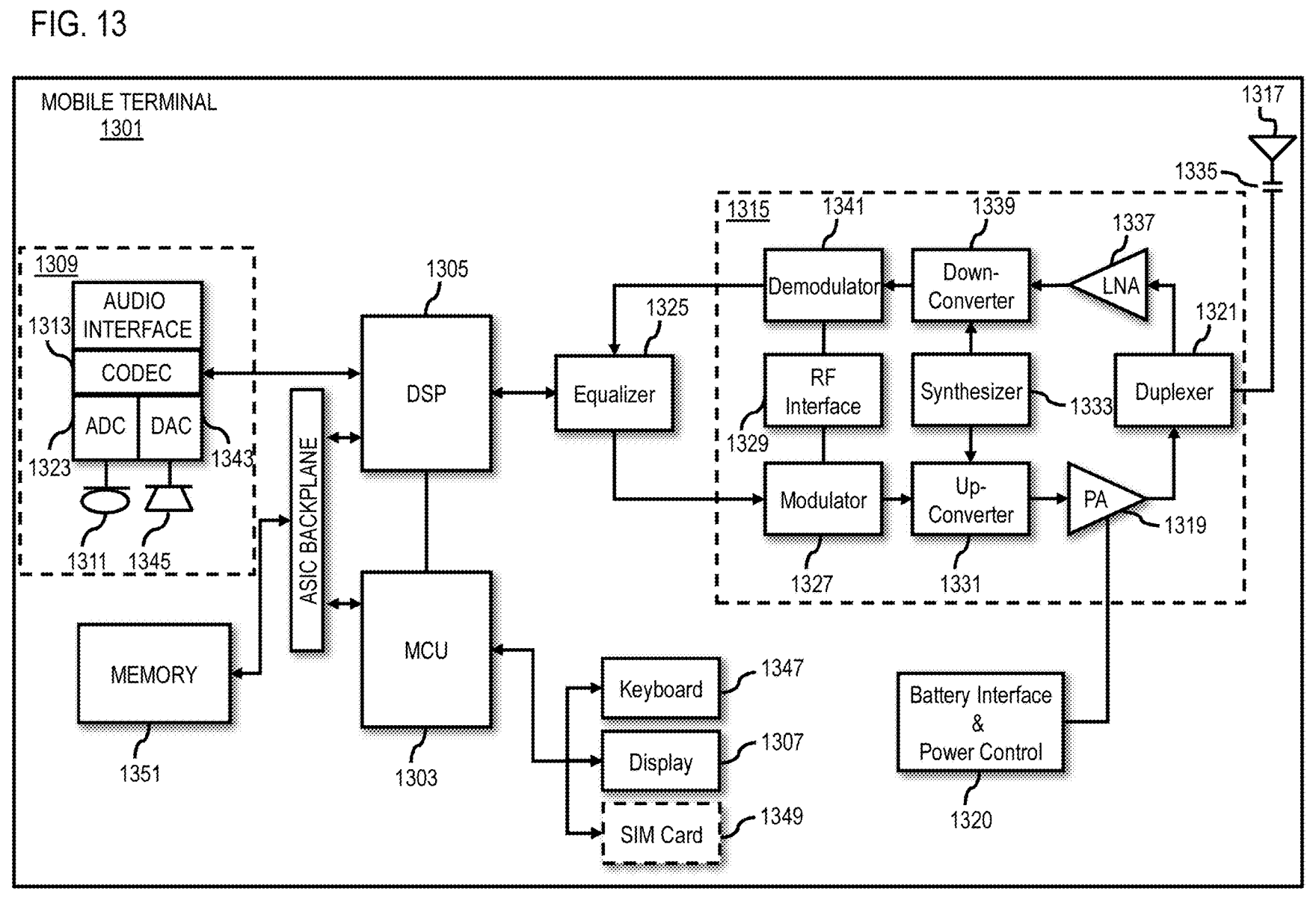

FIG. 13 is a diagram of exemplary components of a mobile terminal 1301 (e.g., a vehicle 125 and/or UE 127 or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna

1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide spatial aggregation for location-based services. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for spatial aggregation to generate a traffic analysis zone comprising:

determining a plurality of partitions of a geographic area;

determining a set of destinations that is common to a first partition and a second partition of the plurality of partitions, wherein the set of destinations are associated with a plurality of trips originating from the first partition, the second partition, or a combination thereof;

determining a statistical property of the plurality of trips to any of the set of destinations from the first partition, the second partition, or a combination thereof;

determining a number of inter-partition trips between the first partition and the second partition;

merging the first partition with the second partition into the traffic analysis zone based on the statistical property and based on determining that the number of inter-partition trips is below a threshold value, wherein the traffic analysis zone represents a reduced-dimensionality feature for training a machine learning model;

training the machine learning model using the traffic analysis zone as a training input to generate a trained machine learning model, wherein training using the traffic analysis zone reduces memory and processing resources used by one or more processors compared to training the machine learning model using the first partition and the second partition;

generating, by the trained machine learning model, an estimated time of arrival (ETA) for a query trip; and transmitting a control command based on the generated ETA to a user device, the control command configured to cause a modification of a user interface on the user device.

2. The method of claim 1, wherein the statistical property includes at least one of: a first statistical metric for a portion of the plurality of trips originating from the first partition to any of the plurality of destinations, or a second statistical metric for the plurality of trips originating from the first partition and the second partition.

3. The method of claim 2, wherein the first partition and the second partition are merged into the traffic analysis zone based on determining that the first statistical metric and the second statistical metric differ by less than a threshold value.

4. The method of claim 2, wherein the statistical property is based on an estimated time of arrival associated with the portion of the plurality of trips, the plurality of trips, or a combination thereof.

5. The method of claim 4, wherein the statistical property includes a standard deviation of the estimated time of arrival associated with the portion of the plurality of trips, the plurality of trips, or a combination thereof.

6. The method of claim 1, further comprising:

iteratively processing one or more neighboring partitions to merge into the traffic analysis zone until a stopping criterion is met.

7. The method of claim 6, wherein the stopping criterion includes failing to merge the one or more neighboring partitions for a threshold number of consecutive iterations.

8. The method of claim 1, wherein digital map data of a geographic database is discretized based on the output.

9. The method of claim 1, further comprising:

creating one or more traffic analysis zone pairs; and processing the one or more traffic analysis zone pairs using the machine learning model to determine a traffic attribute.

10. An apparatus comprising:

at least one processor; and at least one memory including computer program code for one or more programs, the at least one memory and the computer program code configured to, with the at least one processor, cause the apparatus to perform at least the following:

determine a plurality of partitions of a geographic area;

determine a set of destinations that is common to a first partition and a second partition of the plurality of partitions, wherein the set of destinations are associated with a plurality of trips originating from the first partition, the second partition, or a combination thereof;

determine a statistical property of the plurality of trips to any of the set of destinations from the first partition, the second partition, or a combination thereof;

determine a number of inter-partition trips between the first partition and the second partition;

merge the first partition with the second partition into the traffic analysis zone based on the statistical property and based on determining that the number of inter-partition trips is below a threshold value, wherein the traffic analysis zone represents a reduced-dimensionality feature for training a machine learning model;

train the machine learning model using the traffic analysis zone as a training input to generate a trained machine learning model, wherein training using the traffic analysis zone reduces memory and processing resources used by one or more processors compared to training the machine learning model using the first partition and the second partition;

generate, by the trained machine learning model, an estimated time of arrival (ETA) for a query trip; and transmit a control command based on the generated ETA to a user device, the control command configured to cause a modification of a user interface on the user device.

11. A non-transitory computer-readable storage medium carrying one or more sequences of one or more instructions which, when executed by one or more processors, cause an apparatus to at least perform the following steps:

determining a plurality of partitions of a geographic area;

determining a set of destinations that is common to a first partition and a second partition of the plurality of partitions, wherein the set of destinations are associated with a plurality of trips originating from the first partition, the second partition, or a combination thereof;

determining a statistical property of the plurality of trips to any of the set of destinations from the first partition, the second partition, or a combination thereof;

determining a number of inter-partition trips between the first partition and the second partition;

merging the first partition with the second partition into the traffic analysis zone based on the statistical property and based on determining that the number of inter-partition trips is below a threshold value, wherein the traffic analysis zone represents a reduced-dimensionality feature for training a machine learning model;

training the machine learning model using the traffic analysis zone as a training input to generate a trained machine learning model, wherein training using the traffic analysis zone reduces memory and processing resources used by one or more processors compared to training the machine learning model using the first partition and the second partition;

generating, by the trained machine learning model, an estimated time of arrival (ETA) for a query trip; and transmitting a control command based on the generated ETA to a user device, the control command configured to cause a modification of a user interface on the user device.

* * * * *